UNITED STATES PATENT OFFICE.

JOHN JAMES KNIGHT, OF WIDNES, COUNTY OF LANCASTER, ASSIGNOR OF ONE-HALF TO THOMAS LEECH, OF HOUGH GREEN, DITTON, ENGLAND.

PREPARATION AND PRODUCTION OF MINERAL PHOSPHATES.

SPECIFICATION forming part of Letters Patent No. 276,143, dated April 17, 1883.

Application filed October 3, 1881. (No specimens.) Patented in England December 22, 1880, No. 5,374.

*To all whom it may concern:*

Be it known that I, JOHN JAMES KNIGHT, a subject of the Queen of Great Britain and Ireland, and residing at Widnes, in the county of Lancaster, England, have invented certain improvements in the treatment of mineral phosphates containing alumina and oxide of iron, or either of them, for the production of phosphoric acid and salts of alumina and iron, (for which I have obtained a patent in Great Britain, No. 5,374, dated December 22, 1880,) of which the following is a specification.

Mineral phosphates containing alumina and oxides of iron—such as redonda, alta vela, and other similar ores—are comparatively useless at present for the manufacture of manures or alumina salts until the phosphoric acid in them is separated from the alumina and oxides of iron, and the separation of these is the object of my said invention.

My invention consists principally in the treatment of such mineral phosphates with an excess of sulphuric acid of the specific gravity of 140° of Twaddle's hydrometer (equal to 1.70°) and upward, in the manner hereinafter described, by means of which the sulphates of alumina and iron produced are rendered insoluble in the excess of sulphuric acid, while the phosphoric acid is rendered soluble and mixes with the sulphuric acid.

I take any of the above-named class of mineral phosphates—say, for example, redonda phosphate, which contains about thirty-seven per cent. of phosphoric acid, equal to about eighty per cent. of tribasic phosphate of lime, twenty per cent. of alumina, and ten per cent. of peroxide of iron—and calcine it in kilns by any of the well-known methods. By this means the water of combination is driven off and the mineral rendered easier for the operation of grinding it to a fine powder. I then heat it with an excess—say three or four times its weight—of sulphuric acid of a specific gravity of 140° to 145° Twaddle for about an hour until the mixture gets thick and of a gray color. I may mention here that if the ground raw redonda phosphate is used the sulphuric acid should not be of less strength than 150° Twaddle, as the combined water in the mineral weakens the acid. The mixture is run onto a filter composed of asbestus, sand, or other substance which will withstand the action of the strong acids, placed in a vessel of any convenient size and shape, and the filtration assisted by means of a vacuum-pump. The filtrate is a mixture containing practically free phosphoric and sulphuric acids, and from this solution the sulphuric acid can, if desired, be driven off by distillation in the ordinary way, condensed, and used over again for treating more mineral phosphates. The phosphoric acid left in the retort is then suitable for the manufacture of phosphorus, and also for the manufacture of alkalies and their phosphates in the decomposition of their muriates or sulphates. The filtrate itself may be used direct for the decomposition of the alkaline sulphates. The filtrate may also be used in the manufacture of manures and superphosphates of lime in the manner well known to manure manufacturers by treating it in the mixing-machine with commercial phosphates of lime, thus making a superphosphate of superior quality, the free phosphoric acid acting on the phosphate of lime and rendering it soluble in the same way that sulphuric acid acts. The percentage of phosphoric acid in this filtrate may be increased, if desired, by treating another batch of the redonda phosphate with it, and the addition of enough sulphuric acid to combine with the alumina and oxides of iron, instead of using fresh sulphuric acid, and this will give a higher percentage of soluble phosphate in the superphosphate made from it. The residue on the filter which is insoluble in the sulphuric acid is then washed with sulphuric acid of 140° Twaddle and upward, and the washings, after filtration, are used in the treatment of fresh redonda phosphate in the same manner as above described. The residue consists of a mixture of sulphate of alumina, sulphate of iron, silica, and free sulphuric acid, and this I treat by either of the following methods, namely: first, I distil the mixture at a temperature sufficient to expel the excess of sulphuric acid only, which is condensed and used over again, if desired, leaving as residue the sulphates of alumina and iron, which may then be utilized in the manufacture of alum and sulphate of alumina for the purification of sewage and for other industrial purposes; or, secondly, I calcine the mixture in a furnace or retort at a strong red heat and condense the sulphuric-acid fumes given off in a suitable chamber or condenser. By this means the greater part of the sulphuric acid is recovered and may be used over again.

I claim as my invention—

The mode herein described of separating the phosphoric acid from mineral phosphates containing alumina and oxides of iron, said mode consisting in subjecting the phosphates to the action of strong sulphuric acid of the specific gravity of 1.70°, equal to 140° Twaddle, or upward, in excess, substantially in the manner described.

In testimony whereof I have signed my name to this specification in the presence of two subscribing witnesses.

JNO. JAS. KNIGHT.

Witnesses:
GEORGE DAVIES,
JNO. HUGHES.